US009463532B2

(12) United States Patent
Boyle et al.

(10) Patent No.: US 9,463,532 B2
(45) Date of Patent: Oct. 11, 2016

(54) LOW-TEMPERATURE NANOSOLDERS

(71) Applicant: Sandia Corporation, Albuquerque, NM (US)

(72) Inventors: Timothy J. Boyle, Albuquerque, NM (US); Ping Lu, Albuquerque, NM (US); Paul T. Vianco, Albuquerque, NM (US); Michael E. Chandross, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/875,468

(22) Filed: Oct. 5, 2015

(65) Prior Publication Data

US 2016/0023308 A1    Jan. 28, 2016

Related U.S. Application Data

(63) Continuation-in-part of application No. 14/660,707, filed on Mar. 17, 2015, now abandoned.

(60) Provisional application No. 61/955,906, filed on Mar. 20, 2014.

(51) Int. Cl.
| | |
|---|---|
| *B23K 35/02* | (2006.01) |
| *B32B 15/01* | (2006.01) |
| *B23K 35/30* | (2006.01) |
| *B23K 35/365* | (2006.01) |
| *B23K 35/40* | (2006.01) |

(52) U.S. Cl.
CPC ......... *B23K 35/0244* (2013.01); *B23K 35/302* (2013.01); *B23K 35/3006* (2013.01); *B23K 35/365* (2013.01); *B23K 35/404* (2013.01); *B32B 15/01* (2013.01); *B32B 15/018* (2013.01)

(58) Field of Classification Search
None
See application file for complete search history.

(56) References Cited

U.S. PATENT DOCUMENTS

| 5,439,639 A * | 8/1995 | Vianco | B23K 35/262 148/400 |
|---|---|---|---|
| 7,998,239 B1 * | 8/2011 | Nenoff | B22F 1/0018 75/345 |
| 2006/0068216 A1 * | 3/2006 | Hua | B22F 1/025 428/548 |
| 2007/0212562 A1 * | 9/2007 | Shim | B01J 13/02 428/548 |

OTHER PUBLICATIONS

Delogu, F. et al., "Numerical Investigation of the Stability of Ag—Cu Nanorods and Nanowires", Physical Review B, 2008, pp. 024103-1-024103-13, vol. 78.
Tchaplyguine, M. et al., "Core-Shell Structure Disclosed in Self-Assembled Cu—Ag Nanoalloy Particles", The Journal of Chemical Physics, 2013, pp. 14303-1-14303-6, vol. 138.
Schick, M. et al., "Investigation of thin Ag/Cu-Alloy Films on Ru(0001)", Journal of Vacuum Science & Technology A, 1994, pp. 1795-1799, vol. 12.

(Continued)

*Primary Examiner* — Erma Cameron
(74) *Attorney, Agent, or Firm* — Kevin W. Bieg

(57) ABSTRACT

A nanosolder comprises a first metal nanoparticle core coated with a second metal shell, wherein the first metal has a higher surface energy and smaller atomic size than the second metal. For example, a bimetallic nanosolder can comprise a protective Ag shell "glued" around a reactive Cu nanoparticle. As an example, a 3-D epitaxial Cu-core and Ag-shell structure was generated from a mixture of copper and silver nanoparticles in toluene at temperatures as low as 150° C.

4 Claims, 8 Drawing Sheets

(56) References Cited

OTHER PUBLICATIONS

Ferrando, R. et al., "Nanoalloys: From Theory to Applications of Alloy Clusters and Nanoparticles", Chemical Reviews, 2008, pp. 845-910, vol. 108.

Yang, J. et al., "Diffusion and Growth of Nickel, Iron and Magnesium Adatoms on the Aluminum Truncated Octahedron: A Molecular Dynamics Simulation", Surface Science, 2012, pp. 971-980, vol. 606.

Yang, J. et al., "Substrate Dependence of Growth Configurations for Co—Cu Bimetallic Clusters", Crystal Growth & Design, 2012, pp. 2978-2985, vol. 12.

Rapallo, A. et al., "Global Optimization of Bimetallic Cluster Structures. I. Size-Mismatched Ag—Cu, Ag—, and Au—Cu Systems", The Journal of Chemical Physics, 2005, pp. 194308-1-194308-13, vol. 122.

Bunge, S. D. et al., "Synthesis of Coinage-Metal Nanoparticles from Mesityl Precursors", Nano Letters, 2003, pp. 901-905, vol. 3.

\* cited by examiner

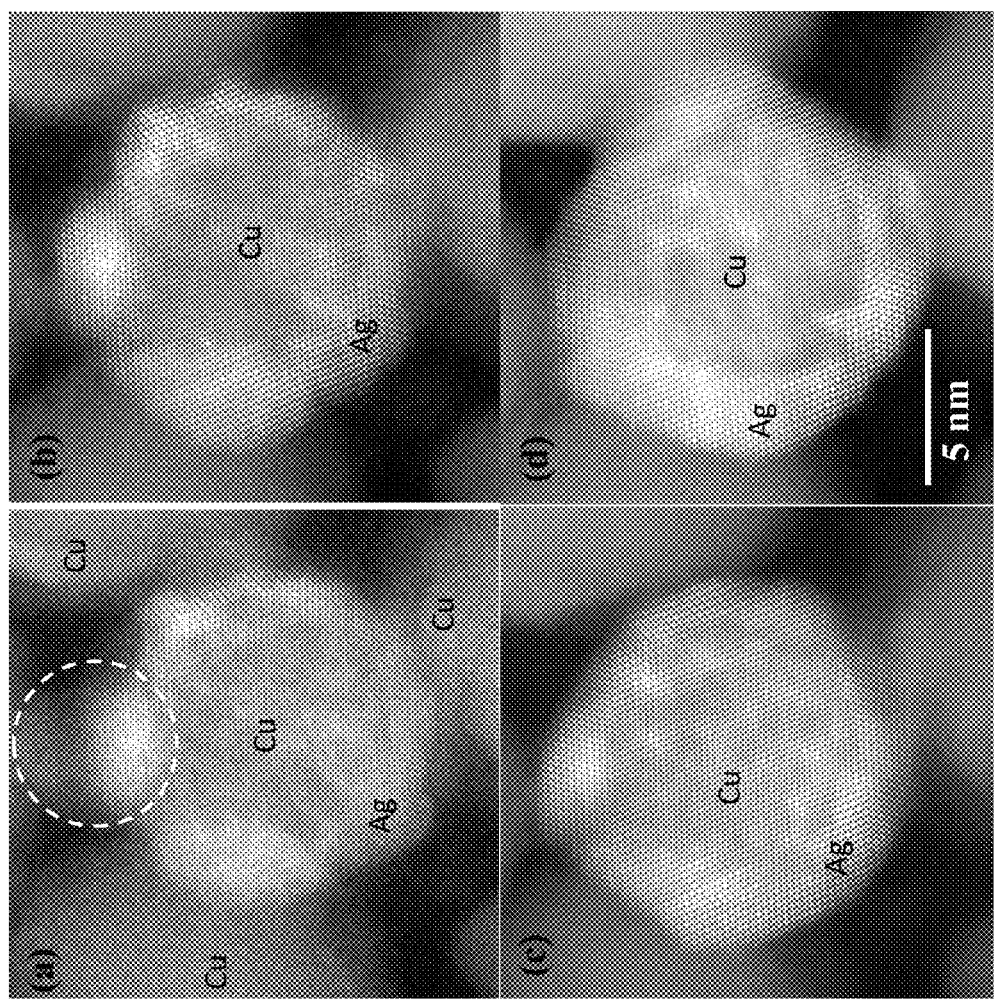

LOW-TEMPERATURE NANOSOLDERS

CROSS-REFERENCE TO RELATED APPLICATIONS

This application is a continuation-in-part of U.S. application Ser. No. 14/660,707, filed Mar. 17, 2015, which claimed the benefit of U.S. Provisional Application No. 61/955,906, filed Mar. 20, 2014, both of which are incorporated herein by reference.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to metal nanoparticles and, in particular, to low-temperature nanosolders having a bimetallic or polymetallic core-shell structure.

BACKGROUND OF THE INVENTION

Although nanotechnology has experienced dramatic development in the area of electronics and devices, some key challenges have to be overcome in order to reach the stage of nanoelectronics manufacturing and commercialization. To date, one major challenge in nanoelectronics and device research is the effective joining of nanoelements (such as nanowires or carbon nanotubes) with low contact resistance to obtain reliable electrical and thermal interconnection. Tin/lead solders have long been used as interconnect materials in the electronic and microelectronic industries. Lead-free solders are being developed due to environmental and safety concerns with lead. Such lead-free solders preferably have a low melting point, should readily wet bond pads to provide reliable bonding between components, and should be available at low cost. However, many lead-free solders are not eutectic and normally require higher processing temperatures. Therefore, nanoscale lead-free solders have been suggested due to the unique properties of materials at the nanoscale, including large surface area per unit volume, large surface energy, and low melting point. The melting temperature depression can reduce the reflow processing temperature and reduce thermal stresses during processing. Further, the finer microstructure can provide increased strength of the solder alloy and higher service temperatures. Finally, nanosolders allow interconnect miniaturization, enabling very small pitch applications and increased fine pitch interconnect reliability.

However, a need remains to understand the synthesis-structure-property relationships in nanosolders for joining/bonding applications to enable further miniaturization of nanoelectronic devices with high quality and reliability. Such lead-free nanosolder materials and nano-soldering techniques could play a key role in the electronics industry, as well as in various areas of advanced materials joining, including medical devices, nanoelectromechanical systems (NEMS), sensors, aerospace and defense industries.

SUMMARY OF THE INVENTION

The present invention is directed to a nanosolder comprising a first metal nanoparticle core coated with a second metal shell, wherein the first metal has a higher surface energy and smaller atomic size than the second metal. The invention is further directed to a method for forming a nanosolder comprising providing a mixture of first metal nanoparticles and second metal nanoparticles in a solution, wherein the first metal has a higher surface energy and smaller atomic size than the second metal, and heating the mixture to a sufficiently high temperature to cause the first and second metal nanoparticles to react to form a nanosolder comprising a nanoparticle core of the first metal coated with a shell of the second metal.

For example, the first metal can comprise copper and the second metal can comprise silver. To demonstrate the invention, in situ STEM analysis revealed the thermal interactions of Cu and Ag NPs that ultimately lead to the formation of a thermodynamically stable 3-dimensional (3-D) epitaxial Cu-core and Ag-shell equilibrium structure of a Cu—Ag nanoalloy. The structure was formed during the thermal interaction of Cu (~12 nm) and Ag NPs (~6 nm) at elevated temperatures (150-300° C.) by the Ag NPs initially wetting the Cu NP along its {111} surfaces at one or multiple locations forming epitaxial Ag/Cu (111) interfaces, followed by Ag atoms diffusing along the Cu surface. The sharp interfaces were found consistently between the epitaxial Ag-shell and the Cu-core. The formation of this core-shell structure was attributed to a nanoscale effect related to the large surface-to-volume ratio of the particles. Finally, although the exemplary observations were limited to the Cu—Ag system, a similar formation process and equilibrium core-shell structure can be expected to extend to other bimetallic and polymetallic systems where metal NPs with different atomic sizes and differing surface energies are thermally interacted.

A model was developed to demonstrate the energetics of formation of the core-shell structure, particularly with the radii of the initial particles taken into account. This model indicated that for the Cu—Ag core-shell arrangement, relatively smaller particles of Cu and larger particles of Ag are the most energetically favorable to form a core-shell structure. In addition, this structure was calculated to be the most favorable to form along {111} faces, which was seen experimentally. The model can be used for directing synthesis routes for nanoparticles, as well as for choosing specific metallic species which are more or less likely to form such core-shell structures.

BRIEF DESCRIPTION OF THE DRAWINGS

The detailed description will refer to the following drawings, wherein like elements are referred to by like numbers.

FIGS. 2(a)-2(d) show HAADF images showing the formation process of a Cu—Ag core-shell particle. FIG. 2(a) shows a partially formed core-shell particle at 150° C. and images of the same particle after additional heating at 150° C. with respect to the image in FIG. 2(a) are shown at 3 min (FIG. 2(b)), 6 min (FIG. 2(c)), and 13 min (FIG. 2(d)).

DETAILED DESCRIPTION OF THE INVENTION

Figure 1B:
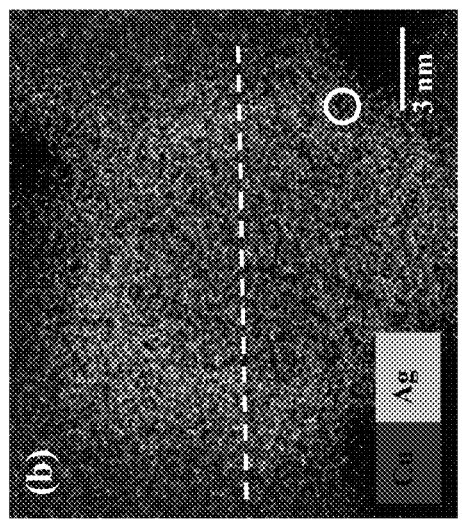
FIG. 1(b) is an EDS element map of Cu and Ag obtained from the core-shell particle. The circle at the right-lower corner marks an area used for the EDS quantification.

New physical and chemical phenomena related to nanoscale effects are currently the focus of intense research. Nanoparticles (NPs) are characterized by small volumes and a large number of surface atoms, which inherently possess a significantly larger mobility than bulk atoms. As a result, novel structures, physical properties, and processes can occur with NPs that are not observed for their bulk counterparts. See J. Gleiter, *Acta Mater.* 48, 1 (2000); F. Delogu et al., *Phys. Rev. B* 78, 024103 (2008); R. Ferrando et al., *Chem. Rev.* 108, 845 (2008); and A. Aguado and J. M. Lopez, *J. Chem. Phys.* 135, 134305 (2011). For instance, the melting point of a metallic NP is typically lower than that of the bulk metal. See V. Levitas and K. Samani, *Nature Communications* 2011, DOI: 10.1038/ncomms1275; P. Puri and V. Yang, *J. Phys. Chem. C* 111, 11776 (2007); and S. L. Lai et al., *Appl. Phys. Lett.* 72, 1098 (1998). For the metallic copper (Cu) and silver (Ag) system, it is well known that the solid solution of the binary Ag—Cu alloy is unstable, and upon heating an initially amorphous or nanocrystalline Ag—Cu alloy in bulk form will separate into Ag and Cu phases due to the large miscibility gap and positive enthalpy of mixing for this eutectic system. See B. X. Liu et al., *Mater. Sci. Eng. R: Reports* 29, 1 (2009); P. Duwez et al., *J. Appl. Phys.* 31, 1136 (1960); S. Mader et al., *Acta Metall.* 15, 203 (1967); and H. Chen and J. M. Zuo, *Acta Mater.* 55, 1617 (2007). However, it has been unknown whether the same phenomena would also take place when the Ag—Cu alloy is at the nanoscale.

Molecular Dynamics (MD) simulations have shown the formation of a Ag-rich phase segregated at the surface during thermally-induced phase separation processes in nanoscale Ag—Cu alloy rods and wires. See F. Delogu et al., *Phys. Rev. B* 78, 024103 (2008). Recent experiments also revealed formation of core-shell Cu—Ag NPs in a self-assembled, free-standing Cu—Ag NP alloy synthesized by magnetron sputtering; however, it is not clear if the NPs formed under these conditions were at equilibrium and, in addition, the process of the core-shell formation was not reported. See M. Tchaplyguine et al., *J. Chem. Phys.* 138, 104303 (2013). There are also reports that show the alloying temperature decreases more than several hundred degrees for Ag—Cu samples in a surface geometry, indicative of the reduction of the miscibility gap for the low-dimensional system. See M. Schick et al., *J. Vac. Sci. Technol. A*12, 1795 (1994). Nevertheless, it remains unclear what the equilibrium Cu—Ag NP alloy structure is, how it forms, and particularly how the new NP alloy structure is related to the equilibrium phase diagram of the Cu—Ag bulk system.

While a number of different final structures are possible from the mixture of two metal nanoparticles (i.e., janus particles or well-mixed clusters), many bimetallic clusters reportedly produce core-shell structures. See R. Ferrando et al., *Chem. Rev.* 108, 845 (2008). The core-shell arrangement is generally formed when either one metal has a lower surface energy than the other (following a general rule of lower surface energy coating higher surface energy) or there is an atomic radius mismatch such that the smaller species tends towards the core to relieve strain, while the large atoms move to the shell. See R. Ferrando et al., *Chem. Rev.* 108, 845 (2008); J. Yang et al., *Surf. Sci.* 606, 971 (2012); J. Yang et al., *Cryst. Growth Des.* 12, 2978 (2012); and A. Rapallo et al., *J. Chem. Phys.* 122, 194308 (2005).

Accordingly, the present invention is directed to a nanosolder comprising a first metal nanoparticle core coated with a second metal shell, wherein the first metal has a higher surface energy and/or smaller atomic size than the second metal, and a method for forming such nanosolders comprising heating a mixture of the two metal nanoparticles to a sufficiently high temperature to cause the nanoparticles to react to form the nanosolder. The metal nanoparticles can typically be about 5-80 nm in diameter. Simulations suggest that two metal nanoparticles having a wetting angle between them of less than about 50 degrees will form a core/shell structure.

As an example of the invention, Cu (~12 nm) and Ag NPs (~6 nm) were thermally reacted and the reaction processes and products were observed using in situ scanning transmission electron microscopy (STEM). The formation of a three-dimensional (3-D), mainly cube-on-cube epitaxial Cu-core and Ag-shell bimetallic structure was observed during thermal interaction of Cu and Ag NPs at temperatures as low as 150° C. As will be described below, the structure was formed by the Ag NPs initially wetting the Cu NP along its {111} surfaces at multiple locations, forming epitaxial Ag/Cu (111) interfaces, and subsequently Ag atoms diffusing along the Cu surface until the shell was complete. Results were compared to Monte Carlo and MD simulations to understand the stability of the structure and provide insight into the driving force(s) for the formation process.

In Situ STEM Heating Experiments

Generally, in situ electron microscopy is performed in transmission electron microscopy (TEM) mode, which offers the ability to observe the process in real-time. However, it was determined that electron beam irradiation of the sample during TEM/STEM imaging severely impacted the Cu—Ag interaction process, preventing continuous, real-time observations from being made. In particular, under normal TEM or STEM imaging conditions, exposure to the beam for as little as 60 sec rendered the NPs inactive. This change in reactivity is likely due to the formation of a carbon shell around the NPs, similar to that found on Au NPs under electron irradiation by Sutter et al. See E. Sutter et al., *Nano Letters* 5, 2092 (2005). As a result, the in situ heating experiments were performed with the electron beam off or with the electron beam on only for the period necessary to obtain the STEM images (typically, less than 30 sec). The in situ experiment was performed in STEM mode to facilitate direct identification of Cu and Ag NPs based on high-angle annular dark-field (HAADF) Z-contrast imaging; in this imaging mode the contrast of Ag is brighter relative to Cu due to its higher atomic number. See S. J. Pennycook and D. E. Jesson, *Phys. Rev. Lett.* 64, 938 (1990).

In situ STEM heating experiments were carried out using the Protochips Aduro™ in situ heating stage, which is capable of extremely fast heating and cooling rates (1000° C./s). See L. F. Allard et al., *Microsc. Microanal.* 16, 375 (2010). A FEI Titan™ G2 80-200 STEM with a Cs probe corrector and ChemiSTEM™ technology (X-FEG™ and SuperX™ energy-dispersive X-ray spectroscopy (EDS) with four windowless silicon drift detectors), operated at 200 kV, was used. The Cu and Ag NPs were synthesized according to the modified literature preparation routes described previously, and had an average diameter of ~12 and 6 nm, respectively. See S. D. Bunge et al., *Nano Letters* 3, 901 (2003). The TEM specimen was made by pre-mixing the NPs in toluene and placing a drop of the mixed solution on a thin carbon film (<5 nm) supported by the TEM grid. By adjusting the solution concentration, Cu and Ag NPs could be assembled on the carbon film such that a monolayer of NPs was formed. Here, the larger Cu and smaller Ag NPs are well mixed, with the smaller Ag NPs present in between and in contact with Cu NPs. This intimate contact is critical for initiating the Cu—Ag reaction, since there is a competitive, low temperature Ag—Ag reaction that also takes place during heating.

Formation of 3-D Epitaxial Cu-Core and Ag-Shell Structure

The reaction between the Cu and Ag NPs was found to take place at temperatures as low as 150° C. and up to about 300° C. Over 300° C., the volatility of the Ag NPs becomes an issue, with most of the Ag NPs evaporating.

Figure 1C:
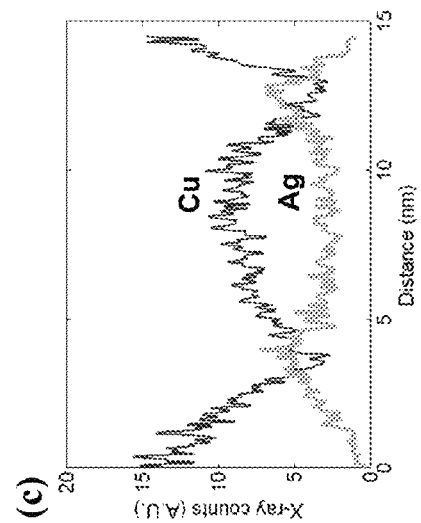
FIG. 1(c) is an EDS line-profile of Cu and Ag along the white dashed line marked in FIG. 1(b).
Figure 1A:
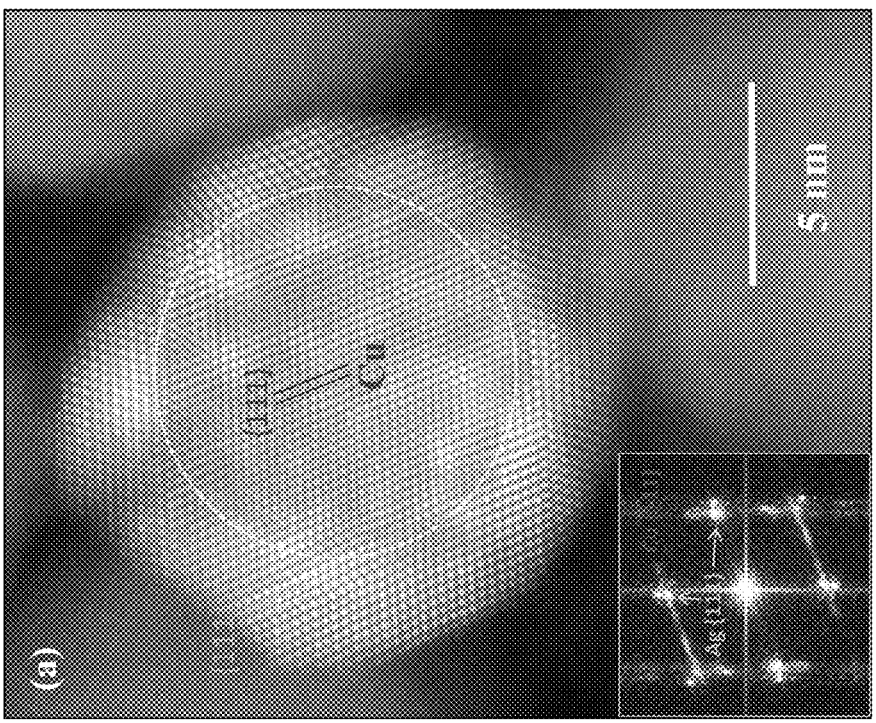
FIG. 1(a) is a high-resolution HAADF image of a Cu—Ag core-shell particle formed at 150° C., along with an inset showing a FFT pattern from the particles. Arrows mark the positions of twin boundaries.

In the 150-300° C. temperature range, the Cu and Ag NPs react to form a Cu-core and Ag-shell structure. FIG. 1(*a*) shows a high-resolution HAADF image of the core-shell structure formed at 150° C. with a Cu-core of ~9 nm in diameter (marked by the circle) and Ag-shell thickness of ~3 nm. The core-shell structure can be clearly discerned due to use of Z-contrast in the HAADF imaging in FIG. 1(*a*). The structure was further confirmed by an EDS element map, as shown in FIG. 1(*b*), and an EDS line-profile across the particles, as shown in FIG. 1(*c*). The EDS map in FIG. 1(*b*) reveals a particle with a somewhat different shape than that observed in FIG. 1(*a*). This is due to the continuously changing Ag-shell that evolves when exposed to inherent electron beam irradiation during EDS acquisition.

The composition of the Ag shell was determined by EDS quantification from an area marked by a small circle in FIG. 1(*b*) where there is no overlapping with the neighboring Cu particles. Within the EDS detection limit of about 1%, the shell was determined to be pure Ag. The FFT image from the particle (shown in inset in FIG. 1(*a*)) reveals that the Ag shell forms predominately in a cube-on-cube orientation relationship with the Cu core, or variants of the orientation relationship related by (111) twinning. Stacking faults and twin-boundaries are present in parts of the Ag shell, as marked by arrows in FIG. 1(*a*). The moiré fringes in FIG. 1(*a*) show overlap between Ag and Cu atoms in the electron beam direction, indicating that the Ag is present on the top and/or bottom surface(s) of the Cu core.

A series of HAADF images showing the process of the core-shell particle formation during heating are shown in FIGS. 2(*a*)-(*d*). FIG. 2(*a*) shows a particle with a core-shell structure that has partially formed. It can be observed that an additional Ag NP (marked by a dashed circle near the top of the image) has started to become part of the Ag shell but has not completely merged. Continuous heating at 150° C. for ~3 min leads to a particle with a more fully formed core-shell structure, as shown in FIG. 2(*b*). Further heating for an additional 3 min gives rise to the final core-shell structure, as shown in FIG. 2(*c*). The moiré fringes at the Cu core become better developed over time as can be clearly observed from FIG. 2(*a*) to FIG. 2(*c*), indicating that the Ag has gradually enveloped the Cu-core. The Cu—Ag core-shell structure shown in FIG. 2(*c*) appears to be stable as long as it stays isolated and no new reactions are initiated with neighboring particles. FIG. 2(*d*) shows the particle after an additional 7 min of in situ heating at 150° C. As can be observed, with the continued heating the Ag shell began new interactions with the Cu particles to its right and in the lower-right corner.

Figure 3:
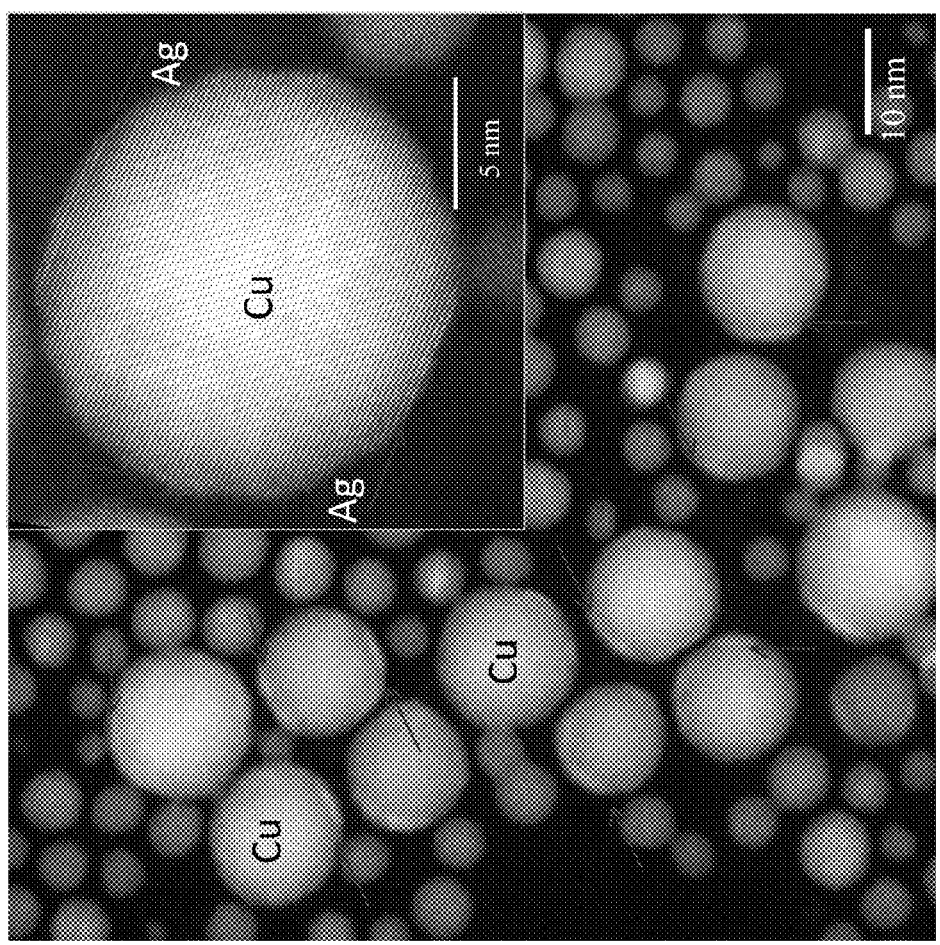
FIG. 3 is a HAADF image showing the initial reaction between Cu and Ag NPs at 200° C. The arrows show the interfaces where Ag wets the Cu NPs. The inset is a magnified image showing that Ag as thin as 2-3 {111} Ag monolayers has formed at the Ag{111}/Cu{111} interface.

The initial Cu—Ag NP reaction involves Ag wetting on Cu surfaces, thereby forming predominately Ag$\{111\}$/Cu$\{111\}$ interfaces. FIG. 3 shows the initial structure of the reaction between Cu and Ag NPs at 200° C. The Ag, which has a brighter contrast in the HAADF image, has wet several Cu NPs in multiple locations as marked by arrows in the image. The inset image in FIG. 3 shows that a sharp Ag$\{111\}$/Cu$\{111\}$ epitaxial interface is formed between the Ag surface layers (as thin as 2-3 $\{111\}$ monolayers) and the Cu. Although it is difficult to determine the exact chemical composition of the thin surface Ag layer directly, the lattice spacing measured from the brighter Ag layer is about 0.236 nm, consistent with pure Ag. This observation indicates that the miscibility gap was likely still present for the nanoalloy system, as even a few monolayers of Ag remain segregated at the surface. Note several Ag NPs can wet a single Cu NP at multiple locations. Since the epitaxial Ag/Cu (111) interfaces have several orientation variants, the twins are often formed between different parts of Ag shell, as shown in FIG. 1(*a*), when several Ag NPs involving with interaction with a single Cu NP merge into a single Ag shell.

Simulations of Core-Shell Structure Formation

The formation of the core-shell structure was studied from a surface energy perspective, with examples elucidating the optimal sizes from both Monte Carlo (MC) and molecular dynamics (MD) simulations. The results of these simulations were fitted to simple forms, which were then used to develop a phenomenological model of the energetics of the core-shell structure. In particular, the energy gained upon formation of this structure was examined as a function of the radii of the two initial nanoparticles to guide synthesis efforts.

Simulation Details

MD simulations were performed with the LAMMPS code using the embedded atom method (EAM) with a Cu—Ag alloy potential developed by Williams, et al. See P. L. Williams et al., *Modelling Simul. Mater. Sci. Eng.* 14, 817 (2006). A time step of 1 fs with a velocity Verlet algorithm was used for the integration with the temperature controlled by a Langevin thermostat. The results obtained from the experiments described above indicate that the core-shell structure forms at temperatures as low as 423 K over a time scale of minutes. Modeling this process is far beyond the timescales accessible by MD simulations. It was therefore appropriate to raise the temperature of the simulations in order to increase the diffusive motion of the atoms. The phase diagram of AgCu binary alloys is a simple eutectic, with a eutectic temperature of 1053 K; however, the EAM potential used underestimates this temperature as 935 K. See P. L. Williams et al., *Mater. Sci. Eng.* 14, 817 (2006). For the MD runs, the goal was to increase the temperature as high as is feasible for increased diffusion, while remaining below the eutectic line. Initial simulations at 723 K indicated that the initial formation of the core-shell structure occurred rapidly but progression to a final equilibrium structure was excessively slow. Therefore the results of the core-shell formation that were run are presented at a temperature of 923 K.

MC simulations were performed with an in-house code, in which Metropolis moves were accomplished by particle swaps with an additional random translation of up to 0.2 Å in any direction. The temperature of the MC simulations was set at 800 K, which was somewhat lower than what was used in the MD models. These results were compared to those at higher temperatures, and while no qualitative difference at 923 K (i.e., the temperature of the MD simulations) could be elucidated, runs at 1200 K (far above the eutectic temperature) showed complete melting and mixing of the system. Therefore, the 800 K MC results represent the structures found at temperatures below the eutectic, without the necessity of using as high a temperature as is feasible, as is the case for the MD simulations. The results are qualitatively similar as there are no structural changes or phase transformations in this region of the phase diagram. Runs were continued until visual inspection indicated an obvious trajectory towards a final state, although these simulations could not establish an equilibrium structure.

Simulation Results

Figure 4A:
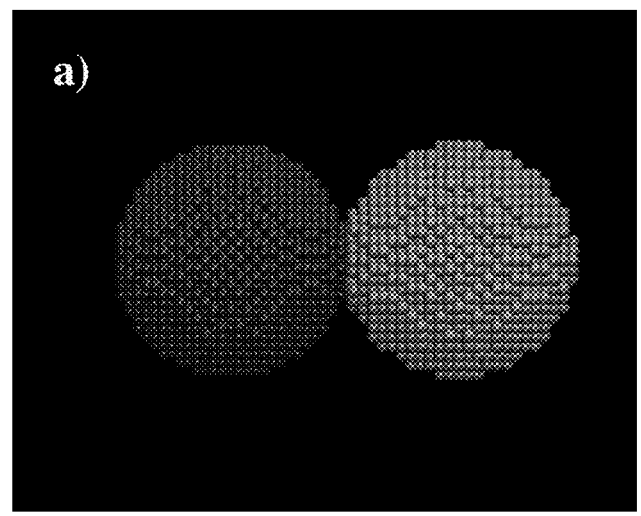
FIGS. 4(a)-4(c) are snapshots from the MD simulation at 0 ns (FIG. 4(a)), 35 ns (FIG. 4(b)), and 35 ns in cross-section (FIG. 4(c)). Silver atoms are shown as light (i.e., sphere to the right in FIG. 4(a)) and copper atoms as darker (i.e., sphere to the left in FIG. 4(a)).
Figure 4B:
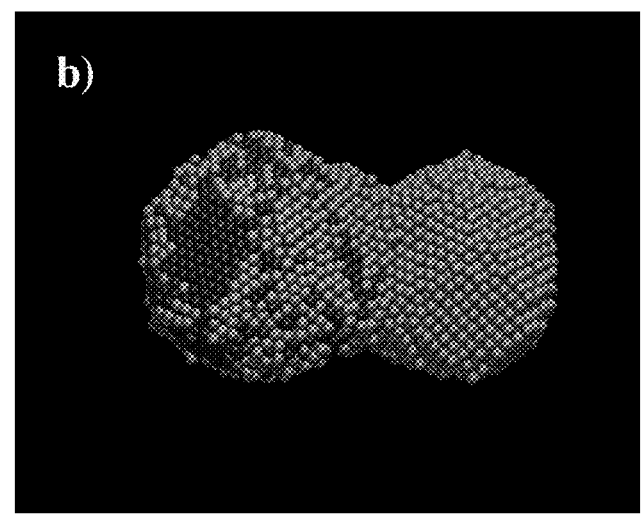
Figure 4C:
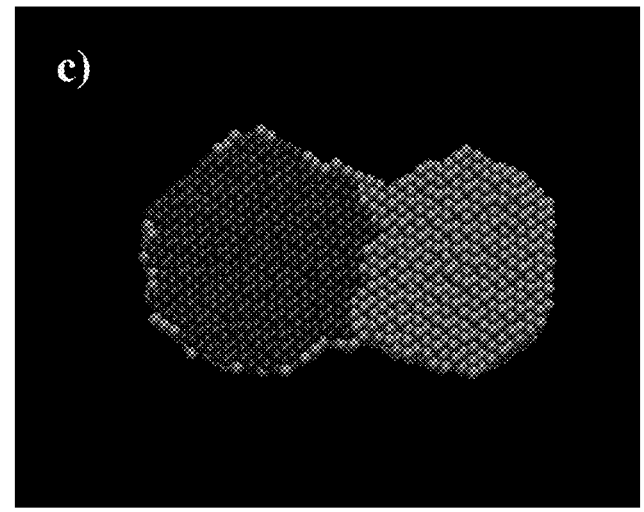

As shown in FIG. 4(*a*), simulations began with either Ag or Cu nanoparticles of specified radii that were cut from a large block of FCC material. While it is not expected that experimentally synthesized nanoparticles are spherical, particularly at small sizes, this starting geometry is reasonable for accessing the effects of different surface energies on a final state, and has the flexibility to develop a phenomenological model. It is expected, however, that final state geometries will more accurately represent experimental systems (as shown, for example, by the faceting in FIG. 4(*c*)). Because of the large barriers for diffusion reported for Ag along Cu surfaces, these simulations only show the general trend of the shell formation. See Y. Mishin et al., *Phys. Rev. B* 63, 224106 (2001). Selected snapshots of the simulation results over time are shown in FIGS. 4(*a*)-(*c*). Runs for the MD calculations began with a 5 nm particle of Ag and Cu that were touching at a single interface along the (010) face. FIG. 4(*a*) shows the particles in contact (Ag sphere is on the right and Cu sphere is on the left), after energy minimization, prior to dynamics. FIG. 4(*b*) reveals the same particles after 35 ns of runtime (T=923 K) and clearly shows that the Ag atoms diffuse along the outer surface of the Cu particle (preferring step edges on the {111} plane) and not through the interior. This is in agreement with literature calculations from Baletto and co-workers, which reported the lowest energy barrier for Ag atom on a Cu surface exists for jumps along {111} facets. See F. Baletto et al., *Phys. Rev. B* 66, 155420 (2002). This is also in agreement with the above described experimental results.

Figure 5A:
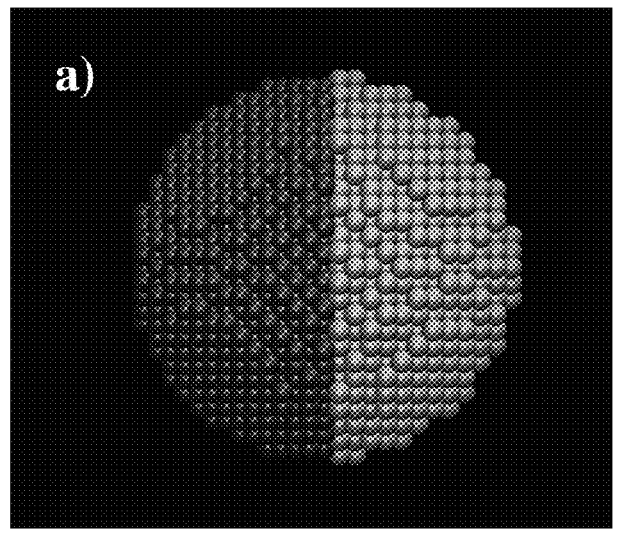
FIGS. 5(a)-5(c) are snapshots from the MC simulation after 0 MC steps (FIG. 5(a)), 400 million MC steps (FIG. 5(b)), and 400 million MC steps in cross-section (FIG. 5(c)). Shadings are the same as in FIGS. 4(a)-4(c).
Figure 5B:
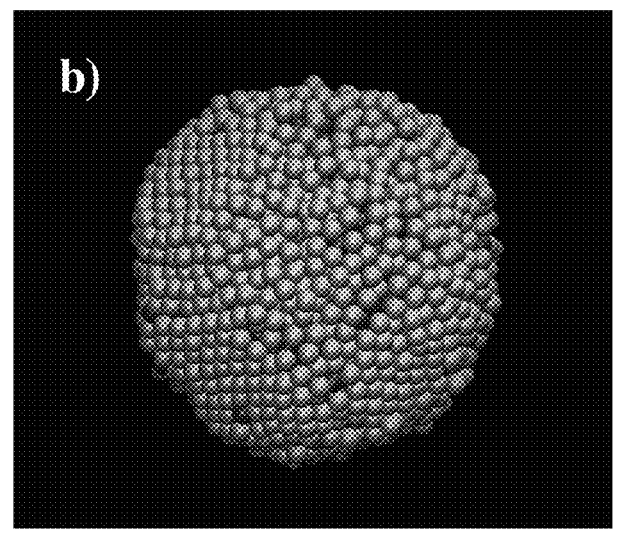
Figure 5C:
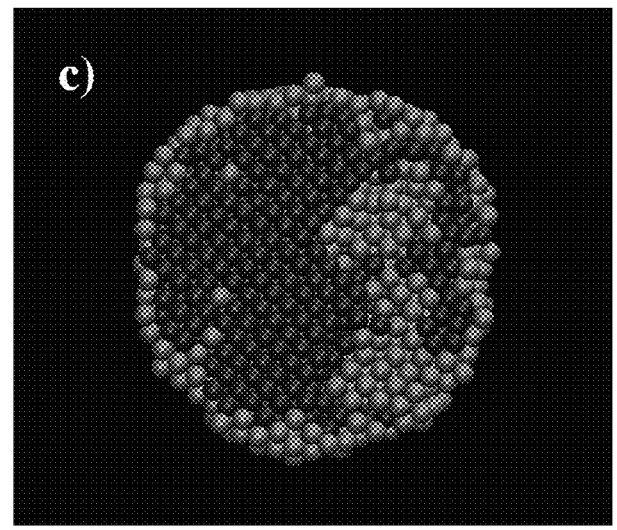

The slow formation of the Ag shell essentially moves the time scale out of the range of MD simulations, even at the elevated temperatures employed. Therefore, MC simulations were investigated to arrive at a better picture of the ending state. As described above, the MC code used performs random particle swaps (in this case, attempting to exchange Cu for Ag atoms at each MC step) with a small (<0.2 Å), random translation. Therefore, the process of changing the initial shape of the structure (e.g., from two spherical particles as in the MD simulations to a single spherical core-shell structure) would be exceedingly slow. Instead, a spherical structure, in which one side was composed entirely of Cu atoms and the other entirely of Ag atoms, was used and is hereafter referred to as a janus-NP. The results from the MC simulations are shown in FIGS. 5(*a*)-(*c*). As shown in FIG. 5(*a*), the initial janus-NP consists of a particle with a radius of 5 nm that is divided spatially which results in an unequal number of Ag and Cu atoms.

After 400 million MC steps, FIGS. 5(*b*) and 5(*c*) show the state of the simulation. Note: this is not a true intermediate state as in MD simulations but rather a snapshot of what the preferred final configuration was trending towards. As can be observed, the preferred mechanism is to have the Ag atoms move from core positions to the shell, while Cu atoms move into the core. As the simulation progressed, fewer Ag atoms were present in the "core" region and progress towards the final state became asymptotically slower. While these simulations have not yet reached an equilibrium structure, the lowest energy state can be unambiguously identified as the Cu—Ag core-shell structure. Simulation methods exist that can further push this system towards a true energetic minimum. See R. Ferrando et al., *Chem. Rev.* 108, 845 (2008). The results shown in FIGS. 4(*a*)-(*c*) and 5(*a*)-(*c*) show an obvious trend towards a core/shell structure. With the clear indication that this AgCu EAM potential also favors the correct structure, it was more instructive to calculate properties of this system for use in a phenomenological model than to continue the simulations.

Since simulation and experimental data indicated a preferential arrangement of Ag along Cu {111} planes, the interfacial energies of Ag and Cu slabs (periodic in x and y) were calculated with varying crystal orientations. Slabs of Ag{100} (37×5.1×2.6 nm), Ag{111} (37×5.1×3.5 nm), Cu{100} (37×5.1×2.0 nm) and Cu{111} (37×5.1×3.3 nm) were generated and energy minimized. For the {100} planes, the perpendicular directions are [0 1 0] and [0 0 1], while for the {111} planes, they are [1 1 −2] and [−1 1 0]. There was no mutual rotation of the slabs considered for the interface calculations, and the dimensions perpendicular to the interface (i.e., x and y) were chosen such that they were reasonably close to multiples of the lattice constants of the two metals. This was an attempt to minimize the contribution of the strain energy to the interfacial energy. Because the calculated energies agreed well with previous calculations by other investigators, this procedure appears to be reasonable. The energy of an individual slab has two components as shown in Eq. 1:

$$E_{slab} = N*E_{coh} + 2A\gamma_s \qquad (1)$$

where $E_{slab}$ is the total (minimized) energy of the slab, N is the number of atoms, $E_{coh}$ is the cohesive energy, A is the cross-sectional area and $\gamma_s$ is the surface energy. The cohesive energy was calculated from an energy minimization of a 500 atom cube (with periodic boundary conditions in all three dimensions) of the individual components. Based on these calculations, the cohesive energies were found to be −2.85 eV/atom for Ag and −3.54 eV/atom for Cu, which are in agreement with literature values. See P. L. Williams et al., *Modelling Simul. Mater. Sci. Eng.* 14, 817 (2006); and Y. Mishin et al., *Phys. Rev. B* 63, 224106 (2001). The various combinations of the Ag/Cu surfaces were then put into contact and the interfacial energies calculated using Eq. 2:

$$E = N(Ag)^* E_{coh}(Ag) + A_{slab}\gamma_s(Ag) + N(Cu)^* E_{coh}(Cu) + A_{slab}\gamma_s(Cu) + A_{slab}\gamma_{CuAg} \quad (2)$$

By calculating $N^*E_{coh}$ for each slab separately, and calculating $E_{CuAg}$ from an energy minimization of the interface, the value for $\gamma_{CuAg}$ was calculated and the results are shown in Table 1. These data indicate that Ag{111}/Cu{111} has the lowest energy of all the interfaces studied, explaining previous results. The calculated interfacial energies were in good agreement with previous interfacial energies that were calculated using a different EAM potential; the energies of semi-coherent interfaces were found to be 0.231 J/m² for {111} and 0.530 J/m² for {100} (10). For comparison, in Table 1 are shown the surface energies of the various orientations of Ag and Cu, as calculated for this EAM potential. Note that these surface energies are significantly higher than the interfacial energies.

TABLE 1

Interfacial and surface energies of various Ag/Cu slabs calculated through Eqs. 1 and 2.

| $\gamma$ (J/m²) | Cu{100} | Cu{111} | Surface $\gamma_{Ag}$ |
| --- | --- | --- | --- |
| Ag{100} | 0.5323 | 0.4331 | 0.940[1] |
| Ag{111} | 0.4752 | 0.1970 | 0.862[1] |
| Surface $\gamma_{Cu}$ | 1.345[2] | 1.239[2] | |

[1] P. L. Williams et al., *Modelling Simul. Mater. Sci. Eng.* 14, 817 (2006).
[2] Y. Mishin et al., *Phys. Rev.* B 63, 224106 (2001).

Model Development

Based on the results from MD and MC simulations, a model that predicts the energy gained by the formation of a core/shell structure by two distinct nanoparticles was developed. The major assumptions that were made in order to construct this model are that both the initial and final geometries of the nanoparticles are spherical, and that the particles are both pure metals. While these assumptions are unlikely to be accurate depictions of experimentally synthesized nanoparticles (or the core/shell structure they might form), they enable determination of both the initial surface energies as well as the final interfacial energies without the difficulties of understanding the effects of, for example, impurities, solvents/coatings, facets, kinks, or steps. This model, then, is a simplification of the energetics of core/shell formation that only accounts for the effects of surface and interfacial energies.

The energy of a lone, spherical nanoparticle is given by Eq. 3, similar to Eq. 1, but in this case with only one surface:

$$E_{sphere} = N^* E_{coh} A\gamma_{sphere} \quad (3)$$

with A being the surface area of the sphere (see Eq. 7), and $\gamma_{sphere}$ being the surface energy of the spherical particle. This surface energy is different from $\gamma_s$ in Eqs. 1 and 2 because of the variety of exposed faces in the sphere. The energy for two non-interacting nanoparticles is given by Eq. 4.

$$E_2 = E_{sphere}(Ag) + E_{sphere}(Cu) \quad (4)$$

Similarly, the energy of a core/shell particle is then given by a combination of the spherical nanoparticle equation as shown in Eq. 5, where there is no longer a contribution from the surface energy of the Cu, as the entire surface of the Cu core is contacting the inner surface of the Ag shell.

$$E_{c/s} = N(Ag)^* E_{coh}(Ag) + A_{Ag}\gamma_{shell}(Ag) + N(Cu)^* E_{coh}(Cu) + A_{Cu}\gamma_{sphere}(AgCu) \quad (5)$$

Figure 6:
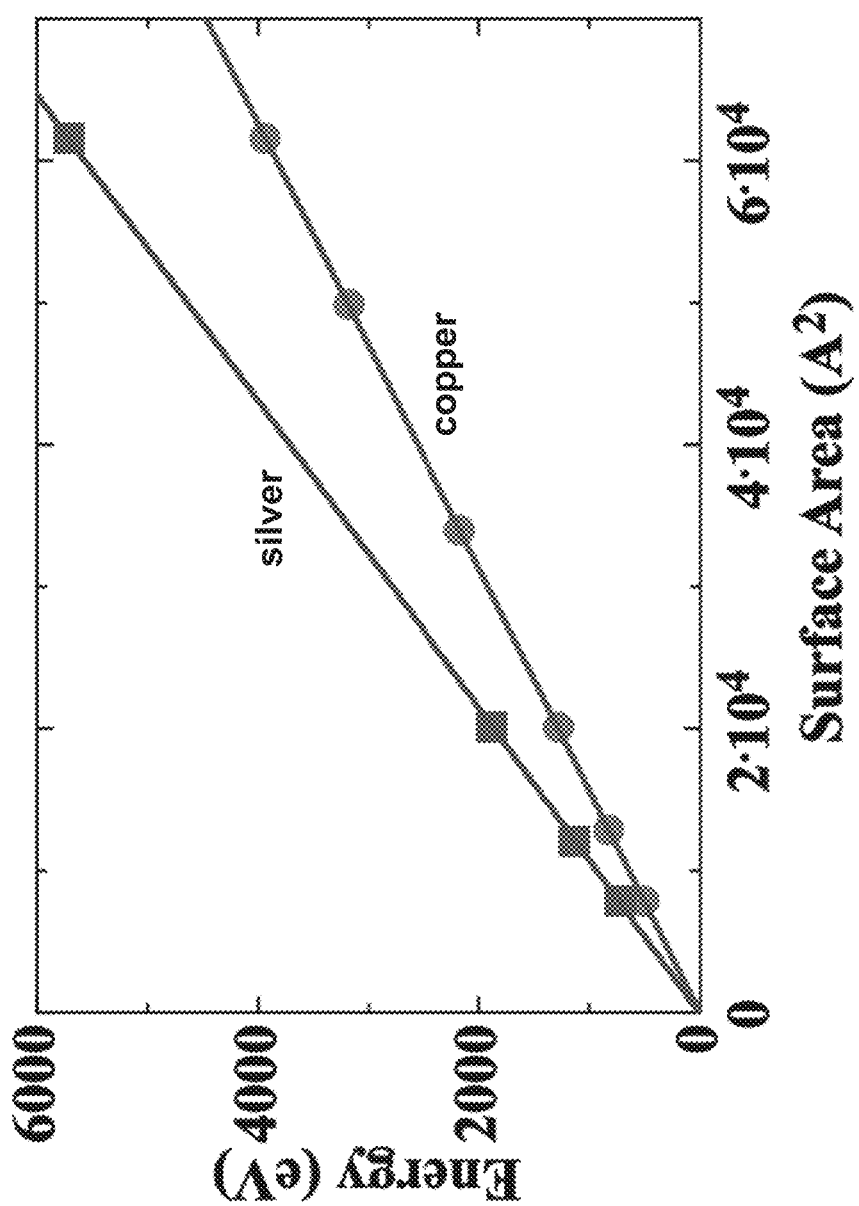
FIG. 6 is a graph showing the surface energy contribution of Ag (squares) and Cu (circles) nanoparticles as a function of surface area. Calculated values are shown as squares and fits are shown as solid lines.

In Eq. 5, the surface energy of the Ag in the core/shell structure is different than that for the bare particle in Eq. 3, because of the different radius of the two structures (i.e., the same amount of Ag will form a larger sphere when coating a Cu particle). To make this distinction clear, the surface energy in this case is denoted as $\gamma_{shell}$. The interfacial energy is now denoted as $\gamma_{sphere}(AgCu)$, to differentiate the value in a spherical geometry from that used in Eq. 2. When Eq. 5 is reduced to its analytical components, the relationship is shown in Eqs. 6-7:

$$N = 4/3\pi r^3 \rho_m \quad (6)$$

$$A_m = 4\pi r_m^2 \quad (7)$$

where $r_m$ is the radius of the nanoparticle, $\rho_m$ the number density of the metal m, and $A_m$ is the surface area of the nanoparticle. In Eq. 6 the number of atoms N is written in terms of the density of the element and the volume of the particle, while Eq. 7 ensures that the surface and interfacial energies in Eq. 5 are independent of the surface area. The values of $\gamma_{sphere}$ can be determined by calculating the energy of nanoparticles, using Eq. 3 to eliminate the contribution from the cohesive energy, and fitting the data as a function of nanoparticle radius. Fits for Ag and Cu nanoparticles are shown in FIG. 6, with $\gamma_{sphere}(Ag)=1.024$ J/m² (0.063891 eV/A²) and $\gamma_{sphere}(Cu)=1.486$ J/m² (0.092733 eV/A²). These values, while slightly larger, are close to the calculated slab surface energies shown in Table 1. The comparison is not exact given that the nanoparticles have a variety of exposed surface textures.

The final parameter necessary for Eq. 5 is the interfacial energy $\gamma_{sphere}(AgCu)$ between the Cu core and the Ag shell. The energy of a number of core-shell particles with varying size Ag shells (initial Ag nanoparticle radii of 10, 14, 20 and 25 nm) and Cu cores (radii 5, 10, and 14 nm), both cut from single crystal bulk materials, were calculated in order to arrive at a value for $\gamma_{sphere}$ (AgCu). As with the single nanoparticles shown in FIG. 4(a), these particles have a variety of exposed surface textures, since the bulk single crystal is oriented with the x, y, and z axes aligned along the [100], [010] and [001] directions, respectively. The calculation of a universal value for $\gamma_{CuAg}$ is difficult, as smaller radii Cu cores lead to a contribution from curvature, while smaller Ag NPs lead to a dependence on the final shell thickness. While these contributions should be negligible given large enough initial particles, these calculations show that $\gamma_{sphere}(AgCu)$ ranges from about 0.70-0.74 J/m² (0.044-0.046 eV/A²). These calculated values of $\gamma_{sphere}(AgCu)$ are higher than, but comparable to the largest value shown in Table 1, as discussed above for the values of $\gamma_{sphere}(Ag)$ and $\gamma_{sphere}(Cu)$. For the predictions of the theory, the larger value of $\gamma_{sphere}(AgCu)$ was used as this will only overestimate the interfacial energy, and thus underestimate the energy difference between the core-shell configuration and two separate nanoparticles. Specifically, the energy gained upon core-shell formation was determined by Eqs. 8 and 9:

$$E_{gain} = E_{c/s} - E_2 \quad (8)$$

$$E_{gain} = [\gamma_{shell}(Ag)A_{Ag\ shell} - \gamma_{sphere}(Ag)A_{Ag\ NP}] + [\gamma_{sphere}(AgCu)A_{Cu} - \gamma_{sphere}(Cu)A_{Cu\ NP}] \quad (9)$$

where $\gamma_{shell}$ and $\gamma_{sphere}$ refer to the surface energies in the shell and original spherical geometry, respectively. Since $\gamma_{sphere}(CU)$ is always larger than $\gamma_{sphere}(AgCu)$, the second component of Eq. 9 should be negative (see below). This last statement justifies the selection of the largest values of $\gamma_{sphere}$(AgCu); larger values will lead to an upper bound of $E_{gain}$.

Figure 7:
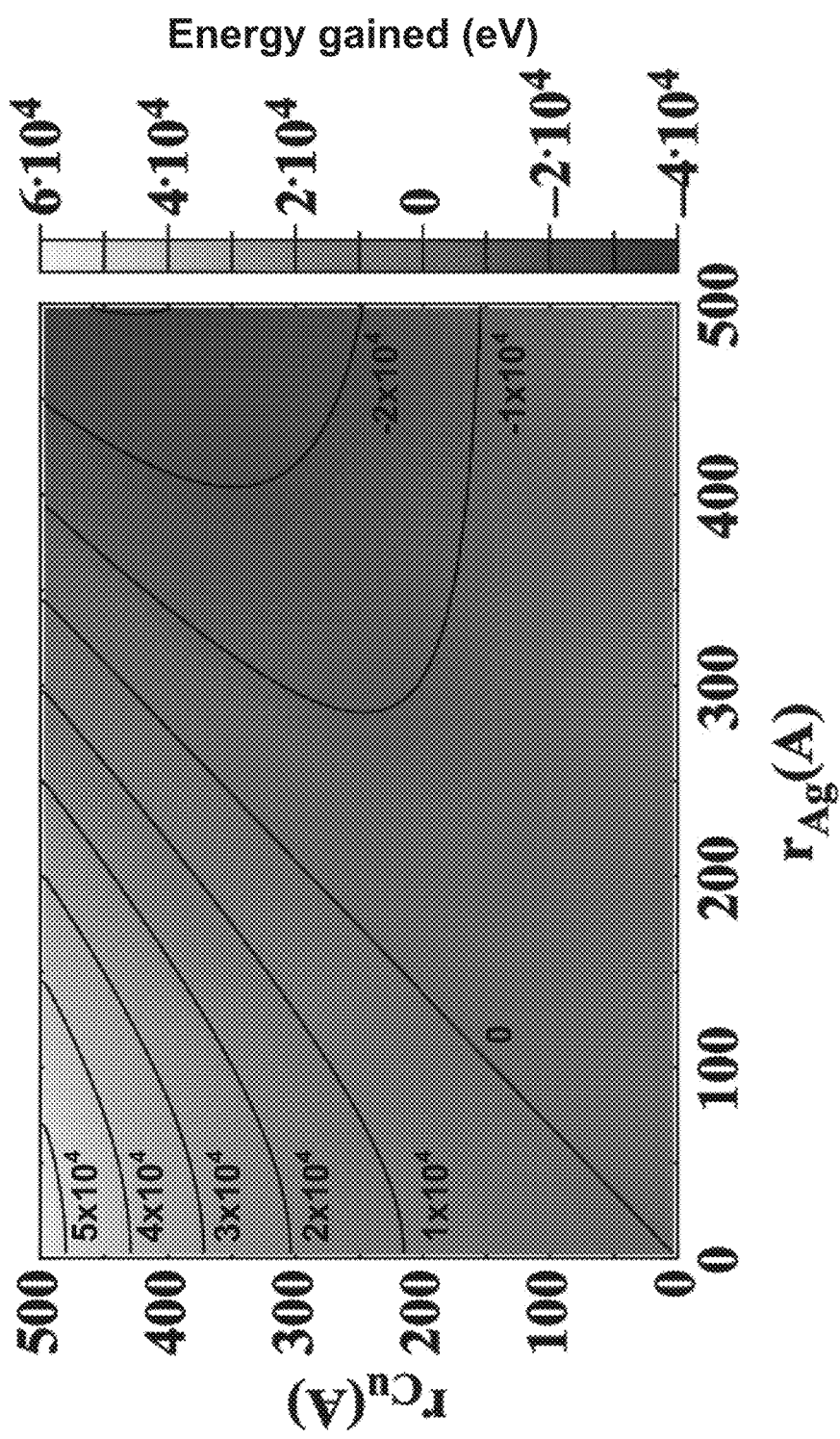
FIG. 7 is a graph showing the energy gained (eV) from formation of a core/shell structure plotted as a function of the initial (i.e., unjoined) particle radii.

These terms represent all that is necessary to calculate $E_{gain}$ as a function of the radii of the two initial particles. A contour plot of the calculated $E_{gain}$ is shown in FIG. 7. The plot shows that the ideal choice for core-shell formation is to utilize relatively small Cu particles as the core with larger Ag particles to act as a shell. For any value of $r_{Cu}$, the energy gained increases (i.e., becomes more negative) as $r_{Ag}$ increases. However, for certain large $r_{Cu}$ values with small $r_{Ag}$, there is no energy gained, and the core-shell structure become unfavorable. Note that this plot is less accurate when either $r_{Cu}$ is small (due to curvature effects in the surface energies) or $r_{Ag}$ is small (because of incomplete shell formation; see discussion below).

To better understand the results of FIG. 7, it is useful to consider the separate contributions from Eq. 9; the first bracketed term representing the difference in the Ag surface energy upon forming a shell from a separate NP, while the second bracketed term is the difference between the Ag/Cu interfacial energy and the surface energy of a bare Cu NP. For a given $r_{Ag}$ the first term increases with increasing $r_{Cu}$. The reason for this lies in the difference in the outer radius of a core-shell as compared to a bare particle. The radius of a core-shell is $(r_{Ag}^3+r_{Cu}^3)^{1/3}$, indicating that as $r_{Cu}$ becomes larger (compared to $r_{Ag}$) the final core-shell radius remains close to that of the initial Cu NP. This is a result of the larger area that must be coated by the same number of Ag atoms, resulting in a thinner shell overall. The larger final radius leads to a larger contribution to the surface energy from the Ag in the core-shell, as opposed to the smaller Ag NP. Note that this contribution to Eq. 9 is never negative. In contrast, the second term is always negative, and becomes larger (i.e., more negative) with increasing $r_{Cu}$ because, as discussed above, the interfacial energy is always lower than the Cu NP surface energy. There is no dependence on $r_{Ag}$ in this term, as would be expected from this simple model, but this is exactly where the inaccuracies of the model in FIG. 7 arise. With smaller initial $r_{Ag}$, it is impossible for the Ag to fully coat the Cu, resulting in incorrect estimates of three terms in Eq. 9. Specifically the contribution Cu surface energy of the core-shell structure is underestimated (in fact, it is completely ignored), while the Ag surface energy and the AgCu interfacial energy are both overestimated. It is therefore expected that the values shown in FIG. 7 are an upper bound of the energy gain. The shell thickness is given by $$r_{shell}=(r_{Ag}^3+r_{Cu}^3)^{1/3}-r_{Cu} \quad (10)$$

which indicates that for most cases with $r_{Ag}<r_{Cu}$ the shell will be incomplete (i.e., the thickness is less than the size of a Ag atom), and thus FIG. 7 can only be used as a guide for optimal initial conditions. As an example, it is clear from the experiments that Ag and Cu NPs with initial radii of 6 and 12-15 nm will form core-shell structures, although FIG. 7 would imply that this is not energetically favorable. See P. Lu et al., *APL Mat.* 2, 022107 (2014). Clearly, the difference in surface energy results in the Ag wetting the Cu, regardless of the initial size of the particles.

Figure 8:
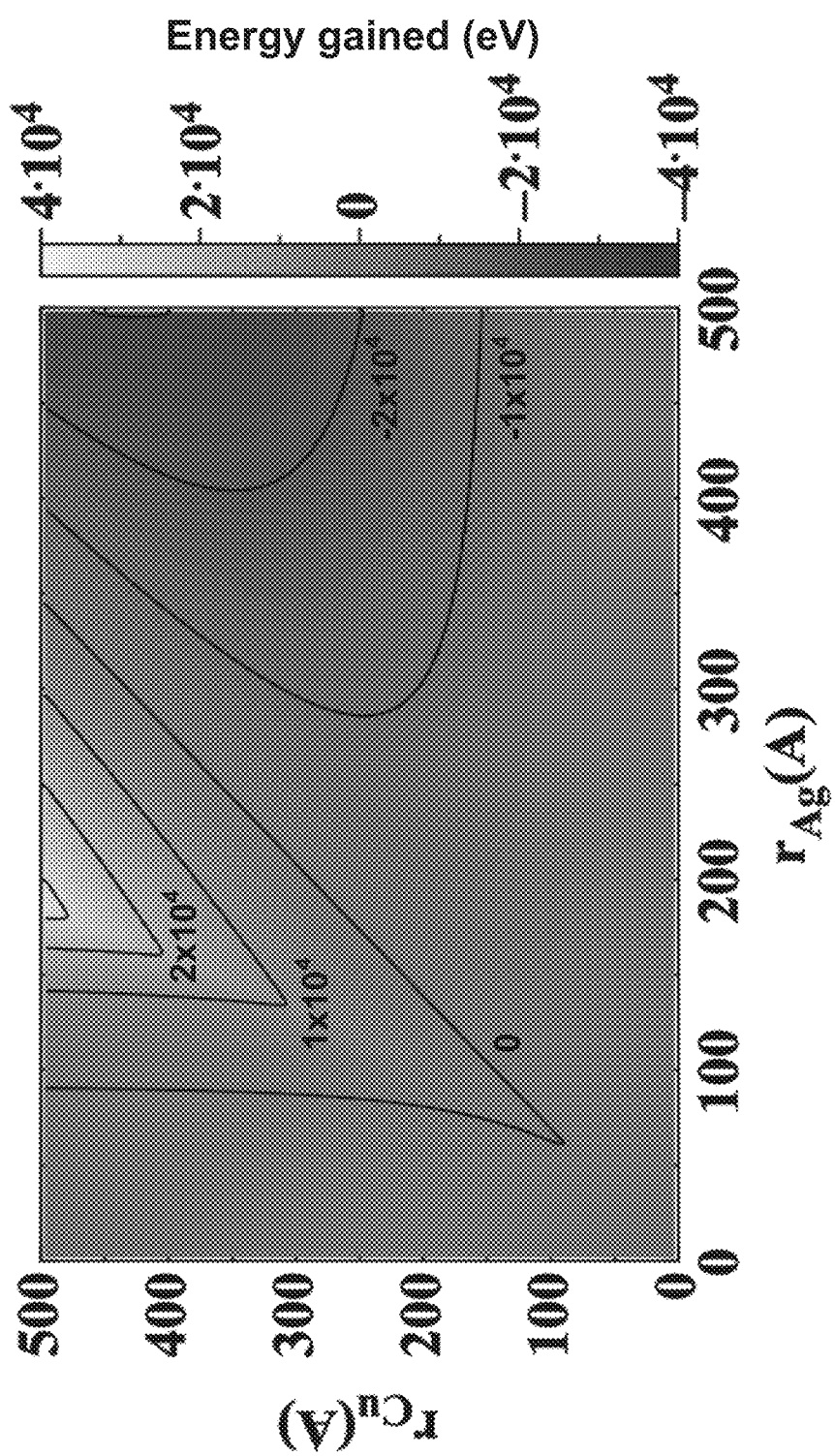
FIG. 8 is a graph showing the energy gained (eV) from formation of a core/shell structure including estimates of the effects of fractional shell coverage.

It is possible to modify Eq. 9 to include a correction factor for incomplete coverage. The fractional coverage, f, can be estimated by $$f=r_{shell}\sqrt{2}\alpha_{Ag} \quad (11)$$

where $\alpha_{Ag}$ is the lattice constant of Ag, and the $\sqrt{2}$ estimates the spacing between neighboring {111} layers. This factor modifies Eq. 9 to be $$E_{gain}=f[\gamma_{shell}(Ag)A_{Ag\ shell}-\gamma_{sphere}(Ag)A_{Ag\ NP}+(1-f)$$
$$\gamma_{sphere}(Cu)A_C+f[\gamma_{sphere}(AgCu)A_{Cu}-\gamma_{sphere}(Cu)A_{Cu} \quad (12)$$

in the cases where f≤1.0 only; when f=1.0 Eq. 12 reduces to Eq. 9. A contour plot of the modified energy is shown in FIG. 8, in which many of the erroneous effects of fractional coverage (specifically when $r_{Ag}<r_{Cu}$) are removed, indicating an energetic gain for most combinations of radii.

This model demonstrates the formation of a core/shell structure from initially distinct particles, rather than through a co-deposition process, as has been demonstrated previously. The model can be useful both for directing synthesis routes for nanoparticles, as well as for choosing specific metallic species which are more or less likely to form such core/shell structures, depending on the desired use. Therefore, although the exemplary observations were limited to the Cu—Ag system, a similar formation process and equilibrium core-shell structure can be expected to extend to other bimetallic and polymetallic systems where metal NPs with different atomic sizes and differing surface energies are thermally interacted. For example, the core metal can have a surface energy that is 1.25 times the surface energy of the shell metal. For example, the nanosolder can further comprise a polymetallic system comprising three or more different metal nanoparticles and/or nanoparticles comprising metal alloys.

The nanosolder provides the opportunity to form a solder joint at low process temperatures because the metal nanoparticles melt at temperatures well below the melting temperature of the corresponding bulk materials having the same composition. Once these nanoparticles have melted, the alloy transitions into its bulk counterpart form, being characterized by the higher melting temperature, and consequently solidifies into the final joint. The higher melting temperature provides the added margin for the joint to successfully perform at higher service temperatures than the initial, nanosolder melting (process) temperature. The rapidity of this transition also minimizes the detrimental effects of long-term exposure between a molten solder and the base materials, including erosion/dissolution of the latter as well as the formation of brittle intermetallic compounds at the solder/base material interface. Moreover, there is no need for quenching the joint as the means to minimize such exposures, which can involve complicated equipment and the risk of thermal shock to the joint. Rather, the solder "naturally" rapidly solidifies, thereby precluding the need for this quenching process step and its potentially detrimental effect on the integrity of the structure.

The present invention has been described as low-temperature nanosolders. It will be understood that the above description is merely illustrative of the applications of the principles of the present invention, the scope of which is to be determined by the claims viewed in light of the specification. Other variants and modifications of the invention will be apparent to those of skill in the art.

We claim:
1. A method for forming a nanosolder, comprising:
providing a mixture of first metal nanoparticles and second metal nanoparticles dispersed in a solution, wherein the first metal has a higher surface energy and smaller atomic size than the second metal and wherein the nanoparticles have diameters less than 100 nanometers; and
heating the mixture to between 150 and 300° C. to cause the first and second metal nanoparticles to react to form a nanosolder comprising a nanoparticle core of the first metal coated with a shell of the second metal.

2. The method of claim 1, wherein the first metal comprises copper and the second metal comprises silver.

3. The method of claim 1, wherein the solution comprises toluene.

4. The method of claim 1, wherein the nanoparticles have diameters between 5 and 80 nanometers.

* * * * *